Patented Apr. 21, 1931

1,802,062

UNITED STATES PATENT OFFICE

IWAN OSTROMISLENSKY, OF NEW YORK, N. Y., ASSIGNOR TO THE PYRIDIUM CORPORATION, OF NEW YORK, N. Y., A CORPORATION OF NEW YORK

METHOD OF OBTAINING WATER-SOLUBLE AZO DYES

No Drawing. Original application filed March 26, 1926, Serial No. 97,771. Divided and this application filed September 23, 1927. Serial No. 221,630.

This invention is an improvement in a method of making aryl-azo-diamino-pyridine dyes easily soluble in water, and the present application is a division of Patent No. 1,680,109, granted August 7th, 1928.

In the investigation of the reactions between diazotized aromatic amines and alpha-alpha-diaminopyridines, as pointed out in my Patents Nos. 1,680,108 and 1,680,109, granted August 7th, 1928, a series of azo-dyes were isolated, each containing the pyridine nucleus in its molecule.

The new groups of azo-dyes of the pyridine series containing two amide groups were obtained by using aniline para-toluidine, para-bromaniline, and the like, in the capacity of original aromatic amines. The groups formed with acids in most cases two series of salts, such as mono- and di-hydrochloride. All of the salts, and in particular the hydrochlorides, dissolve in water with difficulty, but the hydrochlorides dissolve much more readily in water containing hydrochlorides of other azo-dyes, such as para-amino-phenyl-azo-benzol-hydrochloride, or phenyl-azo-diamino-pyridine hydrochloride.

I have found that this substance composed of the compounds, namely; the isomers of phenyl-azo-diamino-pyridine hydrochloride, melting point 137° C., and 203° C., respectively, and diphenyl-diazo-diaminopyridine hydrochloride, melting point 215° C., is while but slightly toxic, strongly bactericidal, for which reason it is of value as a medicinal preparation in a variety of infectious diseases.

To make this substance easily soluble in water, salts of other soluble azo-dyes, such as para-amino-phenyl-azo-benzol-hydrochloride or salts of naphthylamines, and the like, should be added to its hydrochloride. The above-mentioned compounds in pulverulent form, when mixed together mechanically in boiling water, absorbs one another easily and rapidly, and upon cooling the resultant solution forms a stable and altogether homogeneous preparation with a relatively strong bactericidal action.

In particular, a very valuable absorbent substance composed of the isomers of phenyl-azo-diaminopyridine-hydrochloride, with a certain amount of diphenyl-diazo-diaminopyridine hydrochloride is obtained directly in the coupling reaction, by adding to the acid solution made up of one molecule of alpha-alpha-diaminopyridine an acid solution of diazotized aniline to the amount of not less than one-half and not more than two molecules. The absorbent compound of pyridine azo-dyes formed by this reaction has the following formula:—

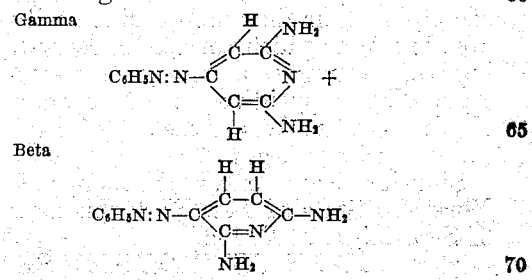

In this connection it may be stated that the diphenyl-diazo-diamino-pyridine may be isolated from the mono-phenyl isomers, since the hydrochlorides of the mono-phenyl isomers are much more soluble in water than the diphenyl. Following are examples of the procedure:—

Examples (a). 100 gms. hydrochloride of phenyl-azo-(gamma)-alpha-alpha-diaminopyridine and 150 gms. of para-amino-phenyl-azobenzol-hydrochloride, are dissolved in boiling water, and are allowed to recrystallize therefrom.

(b). 100 gms. phenyl-azo-(gamma)-alpha-alpha-diaminopyridine hydrochloride and 100 gms. of mono-phenyl-azo-diaminopyridine hydrochlorides in powder are dissolved in boiling water and allowed to recrystallize therefrom.

The product from both processes (a and b) is homogeneous and stable, forming easily .3 to 1% aqueous solutions. To insure complete disappearance of the red coloring, 50 c. c. of a 0.5% solution of the product of process (b) requires 10 to 12 c. c. of a N/10 solution of sodium hydroxide.

What is claimed as new is:—

1. In the method of making aryl-azoalpha-alpha-diaminopyridine easily soluble in water, the step which consists in mixing aqueous solutions of the salts with azo-dyes of the benzol, naphthaline or pyridine series.

2. In the method of making aryl-azo-alpha-alpha-diaminopyridine easily soluble in water, the step which consists in mixing aqueous solutions of the salts with azo-dyes of the benzol, naphthaline or pyridine series in acid solutions.

3. The method of making aryl-azo-alpha-alpha-diaminopyridine hydrochlorides easily soluble in water, which consists in mixing aqueous solutions of the salts with hydrochlorides of other water soluble azo-dyes of the benzol, naphthaline or pyridine series, in hydrochloric acid solutions.

4. The step in the method of making aryl-azo-alpha-alpha-diaminopyridine easily soluble in water, which consists in recrystallizing a mixture of hydrochlorides of aryl-azo-alpha-diaminopyridine, with para-amino-phenyl-azo-benzol-hydrochlorides, from boiling water.

5. The step in the method of making aryl-azo-alpha-alpha-diaminopyridine easily soluble in water, which consists in recrystallizing from boiling water a mixture of aryl-azo-alpha-diaminopyridine, and other water soluble salts of azo-dyes of the benzol, naphthaline or pyridine series.

Signed at New York, in the county of New York and State of New York this 20th day of September, A. D. 1927.

IWAN OSTROMISLENSKY.